United States Patent
Lottes et al.

(10) Patent No.: US 12,548,382 B2
(45) Date of Patent: Feb. 10, 2026

(54) METHOD AND COMPUTER PROGRAM FOR RECEIVING, MANAGING AND OUTPUTTING USER-RELATED DATA FILES OF DIFFERENT DATA TYPES ON A USER-ITERFACE OF A DEVICE AND A DEVICE FOR STORAGE AND OPERATION OF THE COMPUTER PROGRAM

(71) Applicant: AUDI AG, Ingolstadt (DE)

(72) Inventors: Daniel Lottes, Ihrlerstein (DE); Christian Wall, Hitzhofen (DE); Seung Mo Kang, Seoul (KR); Sung Jun Park, Seoul (KR); Jiwon Oh, Seoul (KR)

(73) Assignee: AUDI AG, Ingolstadt (DE)

( * ) Notice: Subject to any disclaimer, the term of this patent is extended or adjusted under 35 U.S.C. 154(b) by 532 days.

(21) Appl. No.: 17/416,113

(22) PCT Filed: Dec. 16, 2019

(86) PCT No.: PCT/EP2019/085345
§ 371 (c)(1),
(2) Date: Jun. 18, 2021

(87) PCT Pub. No.: WO2020/127045
PCT Pub. Date: Jun. 25, 2020

(65) Prior Publication Data
US 2022/0076508 A1    Mar. 10, 2022

(30) Foreign Application Priority Data
Dec. 19, 2018  (EP) .................................... 18214018

(51) Int. Cl.
*G07C 5/00* (2006.01)
*B60W 60/00* (2020.01)
(Continued)

(52) U.S. Cl.
CPC ........... *G07C 5/008* (2013.01); *B60W 60/001* (2020.02); *G07C 5/0816* (2013.01);
(Continued)

(58) Field of Classification Search
None
See application file for complete search history.

(56) References Cited

U.S. PATENT DOCUMENTS 8,359,382 B1    1/2013   Gailloux et al.
9,667,772 B1 *  5/2017   Kaminsky ......... H04M 1/72451
(Continued)

FOREIGN PATENT DOCUMENTS

CN    106227441 A    12/2016
CN    108304432 A    7/2018
(Continued)

OTHER PUBLICATIONS

Extended European Search Report dated Feb. 27, 2019 for European Application No. 18214018.6.
(Continued)

*Primary Examiner* — Hitesh Patel
*Assistant Examiner* — Wenyuan Yang
(74) *Attorney, Agent, or Firm* — STAAS & HALSEY LLP

(57) ABSTRACT

Each of a plurality of user-related data files is managed in one of at least one data group based on at least one predefined criterion. The at least one data group has a respective predefined group output characteristic. A data group is selected based on the predefined group output characteristic on one side and a physical position of a device on the other side. The outputting of the user-related data file of the selected data group is based on the respective predefined data output characteristic and on a physical environment.

20 Claims, 1 Drawing Sheet

(51) Int. Cl.
    *G06F 16/9035* (2019.01)
    *G07C 5/08* (2006.01)
(52) U.S. Cl.
    CPC ... *G07C 5/0841* (2013.01); *B60W 2554/4041* (2020.02); *G06F 16/9035* (2019.01)

(56) References Cited

U.S. PATENT DOCUMENTS

| | | | |
|---|---|---|---|
| 2010/0042285 A1* | 2/2010 | Abernethy, Jr. | G09F 9/30 701/31.4 |
| 2011/0130852 A1* | 6/2011 | Thorn | G06F 16/4387 700/94 |
| 2012/0268294 A1 | 10/2012 | Michaelis et al. | |
| 2016/0171559 A1* | 6/2016 | Conant | H04N 21/4722 705/14.66 |
| 2017/0116543 A1 | 4/2017 | Bai et al. | |
| 2019/0050904 A1* | 2/2019 | Wasserman | G08G 1/0116 |
| 2019/0185019 A1* | 6/2019 | Cho | B60W 60/001 |

FOREIGN PATENT DOCUMENTS

| | | |
|---|---|---|
| DE | 39 25 057 A1 | 1/1991 |
| DE | 10 2006 003 363 A1 | 7/2007 |
| EP | 2 317 706 A2 | 5/2011 |
| WO | 2011/063880 A1 | 6/2011 |

OTHER PUBLICATIONS

International Search Report dated Feb. 12, 2020 for International Application No. PCT/EP2019/085345.
Translation by WIPO of International Preliminary Report on Patentability for PCT/EP2019/085345, issued Jun. 16, 2021, 7 pp.
PCT/EP2019/085345, filed Dec. 16, 2019, Daniel Lottes, AUDI AG.
18214018.6, filed Dec. 19, 2018, Daniel Lottes, AUDI AG.
Chinese Office Action dated Oct. 27, 2023 for parallel Chinese Application No. 201980084267.4.

* cited by examiner

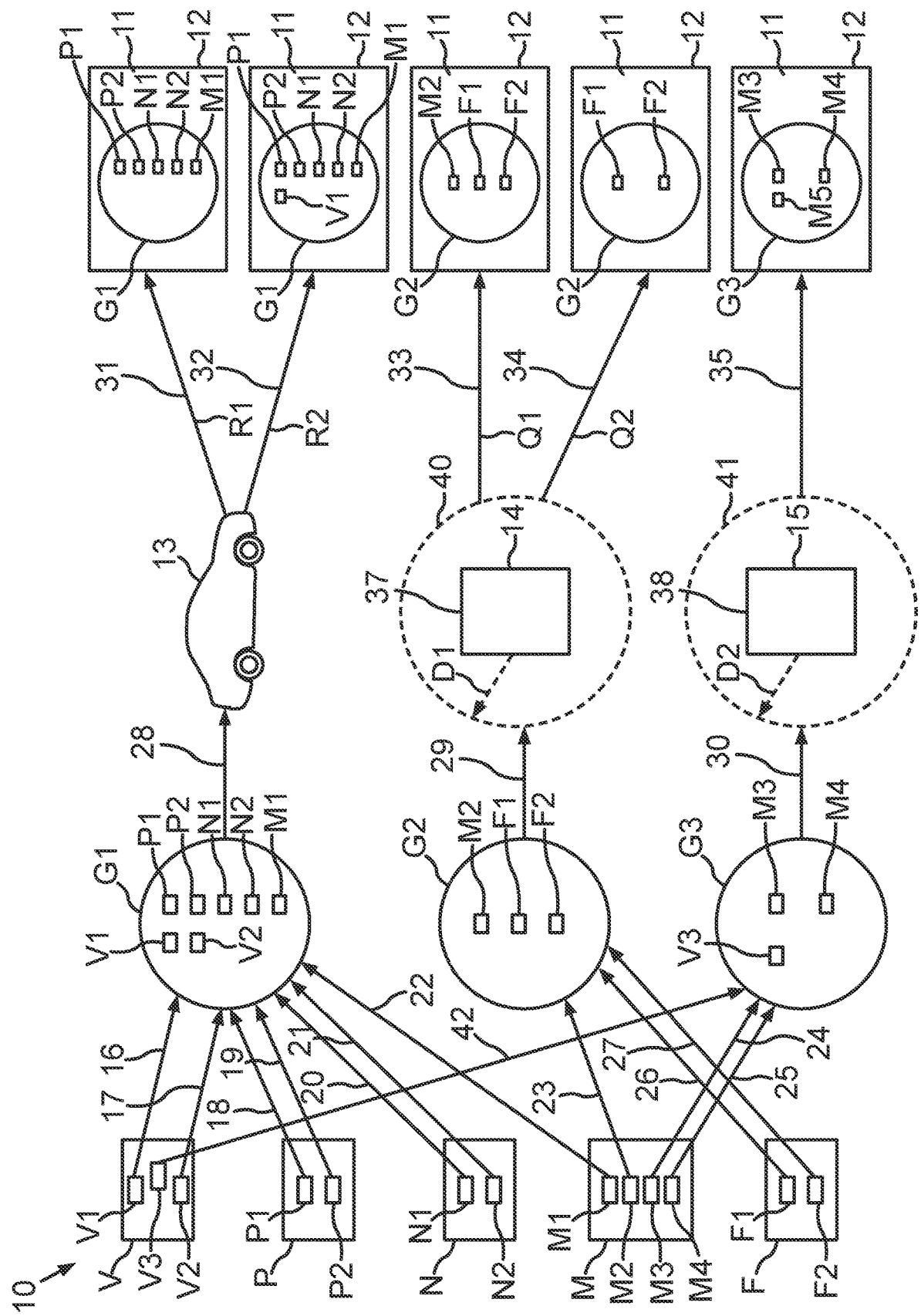

METHOD AND COMPUTER PROGRAM FOR RECEIVING, MANAGING AND OUTPUTTING USER-RELATED DATA FILES OF DIFFERENT DATA TYPES ON A USER-ITERFACE OF A DEVICE AND A DEVICE FOR STORAGE AND OPERATION OF THE COMPUTER PROGRAM

CROSS REFERENCE TO RELATED APPLICATIONS

This application is a U.S. national stage of International Application No. PCT/EP2019/085345, filed on Dec. 16, 2019. The International Application claims the priority benefit of European Application No. 18214018.6 filed on Dec. 19, 2018. Both the International Application and the European Application are incorporated by reference herein in their entirety.

BACKGROUND

Described herein is a method for receiving, managing and outputting a plurality of user-related data files of different data types on a user interface of a device by a computer program for performing the method for receiving, managing and outputting the user-related data files of different data types. A device is used for storage and operation of the computer program performing the method.

In case of an electronic device such as a smartphone a wide variety of distinct information of various kinds is made available. However, it is difficult for a user to view all the individual contents at a given time on the smartphone display panel. Furthermore, the limited time frame makes it difficult for the user to view all the individual contents of the distinct information. Moreover it is difficult to differentiate between the important parts or rather relevant parts of the distinct information from the unimportant ones. Since, it is impossible, to assign which content is to be read and/or viewed and/or listened by the user at a given time or at a given location.

Document EP 2 317 706 A2 discloses a communication system comprising a device for storing and playing back as a voice file, where a recording device or a playback device for a voice file, and a memory for storing the voice file are provided. Another playback device is provided for audio output for the voice file. However, no means for sorting and arranging different voice files is disclosed.

Document DE 39 25 057 A1 discloses a reproduction device which serves to reproduce a location dependent information in a vehicle which is not track bound, the information is produced by comparison of navigationally determined data with data available in a stored road map. The reproduction of the selected information is enabled by storing specific trigger points on the road, which, when passed, initiate the output of special information. However, no means for sorting and arranging different data files is disclosed.

Document DE 10 2006 003 363 A1 discloses a method and an arrangement for a location dependent output of data via mobile terminals and a corresponding computer program and a corresponding computer readable storage medium, which can be used in particular as tourist information system in individual city tours. For this purpose, an arrangement for the location dependent output of data by mobile terminals is proposed, wherein the mobile terminal comprises a data processing device, means for data input and output, means for data storage and a unit for determining the position of the mobile terminal. The mobile terminal is further characterized in that it further comprises a unit for determining the orientation of the mobile terminal. However, no means for sorting and arranging different data files is disclosed.

SUMMARY

Described below is an efficient method for receiving, managing, and outputting a plurality of user-related data files of different data types on a user interface of a device.

The method is provided for receiving, managing and outputting a plurality of user-related data files of different data types on a user interface of the device. The plurality of user-related data files of different types may include telephone calls as voicemails, E-mails, information related to news, weather reports, information related to stock exchange, video information and/or audio information, such as songs from a playlist of an entertainment system and/or from internet. Furthermore, the user-related data files may be of different data volume. Each of the respective user-related data file is received from at least one of a plurality of server computing units depending on the data type of the respective user-related data file. In other words, a user-related data file of a particular data type can be received from a corresponding server computing unit or a plurality of several computing units. For example, a user-related data file corresponding to an E-Mail may be received from a particular E-Mail server computing unit or a plurality of different E-Mail server computing units. Similarly, information related news, such as text information containing news related to e.g., politics and/or sport and/or entertainment, can be received from a particular server computing unit related to a news agency or a plurality of server computing units of different news agencies. For example, information related to politics can be received from a server computing unit of a particular news agency related to politics, information of news related to entertainment can be received from a server computing unit related to an entertainment news agency and/or the information related to sports can be received from a server computing to a sports news agency. Furthermore, the user-related data files corresponding to information related news received from a particular server computing unit may be of a single data type or of different data types, such as the information of news can be in form of a text format and/or a video format and/or an audio format.

Each user-related data file for the plurality of the user-related data files is managed into one of at least data group on a basis of at least one predefined criterion. In other words, different user-related data files may be selected and the selected different user-related data files may be sorted or managed into different groups, for example by a user, on the basis of the user's predefined preferences. For example, the user-related data files of one data type may be in form of E-Mails, wherein one set of E-Mails may be office E-Mails which may be received from an office server computing unit and another set of E-Mails may be private E-Mails which may be received from a private server computing unit or a plurality of private server computing units. Furthermore, the user-related data file may be of a second data type, such as an audio data file which may be received from a music server computing unit which may provide songs of different categories from different playlists. The songs of the different categories may be in the form different genres, such as a genre suitable for concentration, or a genre suitable for entertainment. Furthermore, the user-related data file may be of a third data type, such as a video data file which may be received from a video server computing unit which provides different videos. In this case, the user-related data files from the plurality of user-related data files may sorted or managed, for example by the user, into different data groups on the basis of the user's predefined preferences. For example, the user-related data files may be sorted or managed into three different groups, a first data group which may be named as "car", a second data group which may be named as "office" and a third data group which may be named as "sport". The first data group "car" corresponds to the data group, whose contents are intended to consumed in a car, for example by the user while driving the car, as in the case of manual driving and/or while being inside the car, as in the case of self-driving cars. Similarly, the data group "office" corresponds to the data group, whose contents are intended to consumed in an office, for example by the user in the office. Similarly, the data group "sport" corresponds to the data group, whose contents are intended to consumed in an office, for example by the user while performing sport activities, for example in a sport studio.

In the first data group "car", the user-related data files corresponding to the private E-Mails, the user-related data files corresponding to the songs from the genre suitable for entertainment and the user-related data files corresponding to the videos may be selected, for example by the user. In the second group related to "office", the user-related data files the user-related data files corresponding to the office E-Mails and the user-related data files corresponding to the songs from the genre suitable for concentration may be selected, for example by the user. And for the third data group related to "sport", the user-related data files corresponding to the songs from the genre suitable for entertainment may be selected, for example by the user, since the user would prefer only to listen to music while performing sport activities in the sport studio. This is of advantage, because it enables the different user-related data files to be sorted or managed from the plurality of user-related data files into different data groups according to the user's predefined preferences. This enables the user to differentiate the plurality of information as relevant information from the irrelevant ones at a given time and/or location.

Furthermore, the at least one data group has a respective predefined group output characteristic. The predefined group output characteristic may be associated to a physical position of the device, such as in a car, an office, a sports studio and/or home of the user. Furthermore, the predefined group output characteristic can also be at a particular instant of time such as the instant of time in which the user generally drives to his office by car, the instant of time in which the user is in his office, the instant of time in which the user is in his sports studio and/or the instant of time in which the user is back home. Furthermore, for the outputting of the at least one respective data file of the at least one data group, the at least one data group is selected based on the respective predefined group output characteristic on one side and a physical position of the device and/or a predefined threshold value of a predefined distance of the physical position of the device from a predefined geographical location on the other side. In other words, the predefined group output characteristic may be associated with a physical position of the device such as in the car of the user, the office of the user or the sport studio of the user, wherein the user-related data files are sorted or managed by the user in each of the corresponding data groups as aforementioned. The predetermined group output characteristic, associated with the physical position of the device in the office or the sport studio may be geographical coordinates of the office or the sport studio respectively. The predetermined group output characteristics corresponding to the physical position of the device in the car of the user may include of sensor signals detected by the device which indicates the presence of the device inside a car interior or in a predefined proximity to the car. The physical position of the device and/or a threshold value of a predefined distance of the physical position of the device from a predefined geographical location may be determined by a GPS unit (Global positioning system) of the device.

Once the user is in the car, based on of the sensor signals detected by the device, the first data group "car" with the predefined group output characteristic associated to a physical position of the device, that is in a car, is automatically selected. Hence, the user can retrieve and/or consume all the user-related data files corresponding to the data group with the group output characteristic car. Once the user who is driving by his car to his office nears his office at a predefined distance, for example five meters from his office and based on the information from the GPS unit, which provides a geographical location of the car, that is the device, then the device recognizes that the device is nearing the office and hence based on this information the second data group "office" is selected. Hence, the first data group "car" is replaced by the second data group "office". Hence, the user is now able to retrieve or have access the user-related data files corresponding to the second data group "office" with the predefined data output characteristic associated with the physical position of the device in the office.

When the user is finished with his work in the office and gets into the car then the first data group "car" with the predefined output characteristic associated with the physical position of the device in the car is detected and the respective user-related data files corresponding to the first data group "car" are outputted to the user. Finally, when the user reaches a predefined distance from the sports studio, and based on the geographical location detected by the GPS unit, the third data group "sport" with the predefined data output characteristic associated with the physical position of the device in the sport studio is selected and hence the user-related data files corresponding to the third data group "sport" are outputted on the user interface of the device.

Each of the at least one user-related data file has a respective pre-defined data output characteristic and the outputting of the at least one user-related data file of the selected data group is based on the respective data output characteristic and on the physical environment of the device. The data output characteristic determines the nature of the output of the user-related data on the user interface of the device. Furthermore, the data output characteristic is defined as according to the physical environment condition of the device. The physical environment of the device may be determined by, for example at least one sensor signal from at least one sensor of the device and/or at least one sensor signal from at least one sensor in the physical environment of the device. In other words, once a data group is selected by the device, then based on the physical environment of the device are, the corresponding data output characteristic is selected. As a result of which a respective or corresponding outputting of the at least one user-related data file of the selected data group is managed accordingly by the device. This is of advantage, because the outputting of the user-related data files of the selected data group can be managed as desired by the user himself automatically.

In one embodiment, the managing of the at least one user-related data file into the at least one data group can be updated on a basis of the at least one predefined criterion, when the receiving of a new user-related data file occurs and/or when the outputting of one of the user-related data file can occur, wherein an update signal can be sent to the at least one of the plurality of server computing units. This is of advantage, because when a new user-related data file of a corresponding data group is received from a corresponding server computing unit, then the received new user-related data file is updated into the corresponding data group after being received from the corresponding server computing unit. Furthermore, when the outputting of one of the user-related data file occurs, then an update signal is sent to the at least one of the corresponding plurality of the server computing units. This in return enables the at least one of the corresponding plurality of the server computing units to send a corresponding new user-related data file to the device which is updated into the corresponding data group. Hence, this enables a continuous outputting of the user-related data file of a corresponding data group during the usage of the device.

In one embodiment, one of the at least one data group can have a predefined group output characteristic that may correspond to the physical position of the device being in a vehicle. In other words, the user-related data files may be sorted or managed into a data group, for example by the user, which he wants to consume and/or have access to, while driving the vehicle or while being inside the vehicle. The vehicle may be a manually driven vehicle and/or a semiautonomous vehicle and/or a fully autonomous vehicle. Once the user is inside the vehicle and based on the predefined group output characteristics that corresponds to the physical position of the device being in a vehicle, then the corresponding data group is selected. Hence, the user-related data files of the data group with the output characteristic that correspond to the physical position of the device being in the vehicle is outputted on the user interface of the device. Hence, the user can consume and/or have access to the desired user-related data files from the corresponding data group while being in the vehicle.

In one embodiment, the physical environment condition of the device can include a driving condition of the vehicle. For example, the physical environment of the device which include the driving condition of the vehicle may be of types, a first physical environment corresponding to a manual driving condition and a second physical environment corresponding to an autonomous driving condition. This is of advantage, because this ensures a pleasant, safe and driving friendly access of the user-related data files from the device to the user while driving the vehicle.

In one embodiment, one data output characteristic can correspond to an autonomous driving condition and one data output characteristic can correspond to a manual driving condition. In other words, in the autonomous condition, the data output characteristic may be defined in such a way that that the user-related data files of all the data types are permitted to be outputted on the user-interface of the device. Hence, during the self-driving condition of the vehicle, the user can safely sit and/or lay back on his driving chair and consume the outputted user-related data file from the device, which in return ensures a pleasant experience to the user while being in the vehicle. However, during the manual driving condition, the data output characteristic may be defined in such a way that the user-related data file of the data type of a video data file may be disabled. This ensures a safe driving of the vehicle manually, since the user or the driver is not distracted by the viewing of the video displayed on the user interface of the device.

In one embodiment, a duration of a journey along a driving route that has been planned by a navigation system can be estimated and a rate of outputting of the at least one selected user-data related data file of the at least one data group can be adapted, such that the at least one selected user-data related data file of the at least one data group is outputted before the end of the journey along the driving route. This is of advantage, because this can enable all corresponding user-related data files in a corresponding data group to be outputted in an efficient manner before the end of the journey along the driving route. Hence, it can be ensured that none of the user-related data file is left unconsumed and/or not being accessed by the user before the end of the journey along the driving route that has been planned by the navigation system.

In one embodiment, one of the at least one data group can have a group output characteristic that can correspond to the physical position of the device being in a stationary location. The stationary location may be an office, a sports studio or a home of the user. This is of advantage, because this enables the outputting of the user-related data file of the corresponding data group in a predefined manner, depending on the physical location of the device in a stationary location.

In one embodiment, one data output characteristic can correspond to a solitary environment and one data output characteristic can correspond to an environment with a plurality of persons being present. This is of advantage, because this enables, for example a user, to customize the outputting of the user-related data files of a data group according to the physical environment of the user in a case, when the user is alone or in a case, when the user is in the presence of plurality of persons in his environment. For example, if the user is in a solitary environment, then the user may defined data output characteristic or customize the outputting of the user-related data files in such a manner that all the user-related data files may be outputted by the device. However, if the user is in the presence of a plurality of persons at a given time, then in such a situation, the user may defined data output characteristic or customize the outputting of the user-related data file in such a manner, so that the user-related data files of the data types corresponding to audio format and/or video format, are outputted at a lower audio volume and/or the video data files and audio data files are not outputted. In this case, only the user-related data files corresponding to the data type of text format are outputted. It is further thinkable that in such a situation, the user-related data files corresponding to the audio and video data type are outputted in the form of a text format, wherein the audio data files and the video data files are converted to the text format using a corresponding computer program and a processor executing the corresponding computer program.

In one embodiment, the outputting of the at least one user-related data file can include a visual output signal and/or an audio output signal and/or a haptic output signal. This is of advantage, because it enables the user to consume the user-related data files and/or have access to the user-related data files in a pleasant and efficient manner. It is further thinkable, that an interconversion of the output signals of different types is possible, that is a video output signal and/or an audio output signal can be converted into a text output signal or a visual output signal can be converted into an audio output signal.

Also described herein is a computer program for receiving, managing an outputting of a plurality of user-related data files of different types on a user interface of a device. The device is used for storage and operation of the computer program for receiving, managing and outputting a plurality of user-related data files of different data types on a user interface of the device. The device may be in the form of a computing unit such as a mobile phone, especially a smartphone, a think pad and/or a part of an infotainment system in a vehicle.

Various combinations of the features of the described embodiments may be made, if not stated otherwise.

BRIEF DESCRIPTION OF THE DRAWINGS

These and other aspects and advantages will become more apparent and more readily appreciated from the following description of an exemplary implementation, taken in conjunction with the accompanying drawings of which:

The sole drawing is a schematic block diagram of an embodiment of a method for saving, managing and outputting a plurality of user-related data files of different data files of different data types on a user interface of a device.

DETAILED DESCRIPTION

The embodiment explained in the following has described components that each represent individual features which are to be considered independently of each other and which each are also to be regarded as a component of the method in an individual manner or in another than the shown combination. Furthermore, the described embodiment can also be supplemented by further features already described.

In the FIGURE identical reference signs indicate elements that provide the same function.

The FIGURE shows a schematic illustration of an embodiment of a method for receiving, managing and outputting a plurality of user-related data files V1, V2, V3, P1, P2, N1, N2, M1, M2, M3, M4, F1 and F2 of different data types on a user interface 11 of a device 12. In the further text, the plurality of user-related data files V1, V2, V3, P1, P2, N1, N2, M1, M2, M3, M4, F1 and F2 are referred to as plurality of user-related data files V1 to F2, for the sake of a pleasant readability.

The device 12 may be a computing unit, such as a mobile telephone, especially a smartphone, a think pad and/or a part of an infotainment system in a vehicle. The plurality of user-related data files V1 to F2 may be of different data types, such as digital video data in data files in different forms, such as a MPEG-4 high profile [.mp4] and/or a motion JPEG 2000 [.jp2], digital audio data in data files of different data types, such as a Free Lossless Audio Codec (FLAC), a Wave form audio format [way], a MPEG-1 audio layer [.mp3] and/or an Audio Interchange File Format (AIFF). Furthermore, the user-related data files may be data files of a data type in the format of document scripts which can be found in E-Mail texts such as a rich text format [.rtf], an open document text format [.odt], html [.htm, .html] and/or a plain text [.txt]. The user-related data files V1 to F2 in form of documents and scripts can further enclose attachments in widely used formats, such as MS Word and/or MS Excel and/or pdf files. Furthermore, E-Mails may include attachments such as a JPEG and/or any portable document format. Each of the user-related data files V1 to F2 may be received from at least one of a plurality of server computing units V, P, N, M and F depending on the data type of the respective user-related data file V1 to F2. According to the FIGURE, the user-related data files V1 to F2 of the data type of a digital video data may be the user-related data files V1, V2 and V3 which may be received from a video server computing unit V, the user-related data files P1 and P2 may be private E-Mails of a user (not shown in FIGURE) and may be received from a private server computing unit P, the user-related data files N1 and N2 may be text information of news and may be received from a news server computing unit N, the user-related data files M1, M2; M3 and M4 may be audio data in the form of audio songs belonging to various genres and may be received from a music server computing unit M and lastly the user-related data files F1 and F2 may be office E-Mails of the user and may be received from an office server computing unit F.

The user-related data files V1 to F2 can be received from the respective server computing units V, P, N, M and F wirelessly by the device 12. Each user-related data file V1 to F2 from the plurality of user-related files V1 to F2 can be sorted or managed into one of at least one data group G1, G2 and G3 on a basis of at least one predefined criterion. In other words, the user can manage the user-related data files V1 to F2 in corresponding groups G1, G2 and G3 as per his convenience and/or choice.

According to the FIGURE, at least one data group G1, G2 and G3 may have a respective predefined group output characteristics. The predefined group output characteristic of each data group G1, G2 and G3 can refer to a predefined geographic location and/or a situation. The data group G1 may have a predefined group output characteristic referring to the location of the device 12 in a vehicle 13. This can be achieved by a signal from embedded sensors in the vehicle 13. The signal can be received by the device 12, which then can recognize that the device 12 is located in the vehicle 13.

In the case of data group G2, the corresponding predefined group output characteristic may be in form of a predefined geographical location 37 of an office 14. In the case of the data group G3, the predefined group output characteristic may be in form of a predefined geographical location 38 of a sports studio 15. For the outputting of the at least one respective user-related data file V1 to F2 of the at least one data group G1, G2 and G3, the at least one data group G1, G2 and G3 is selected based on the respective predefined group output characteristic on one side and a physical position of the device and/or a predefined threshold value of a predefined distance D1 of the physical position of the device 12 from a predefined geographic location 37 or of a predefined distance D2 of the physical position of the device 12 from a predefined geographic location 38, on the other side.

When the user holding the device 12 gets into the vehicle 13 and starts the vehicle 13, then the embedded sensors inside the vehicle 13 send a signal to the device 12 which then recognizes the predefined group output characteristics corresponding to the data group G1 and accordingly the data group G1 is selected. Furthermore, when the vehicle 13 arrives near the office 14, as soon as the vehicle 13 arrives in a region of the predefined threshold value of the predefined distance D1 of the physical position of the device 12 from the predefined geographical location 37 of the office 14, then the predefined group output characteristic corresponding to the group G2 is identified and hence, the group G2 is selected. Similarly, when the user with the device 12 arrives in a region with the predefined threshold value of the predefined distance D2 of the physical position of the device 12 from a predefined geographical location 38 of the sports studio 15, then the predefined group output characteristic corresponding to the data group G3 is identified and the data group G3 is selected.

As shown in the FIGURE, the data group G1 may include the user-related data files V1 and V2 which can be received wirelessly from the video server computing unit V, as shown by paths 16 and 17, the user-related data files P1 and P2 including private E-Mails which may be received from the private E-Mail server computing P, as shown by paths 18 and 19. Furthermore, the data group G1 may include the user-related data files N1 and N2 containing text information of news which are received from the news server computing unit N, as shown by paths 20 and 21 and finally, the data group G1 includes user-related data file M1 containing audio data in the form which can be received from the music server computing unit M, as shown by a path 22. Hence, the data group G1 may include the user-related data files V1, V2, B1, B2, N1, N2 and M2.

The data group G2 can include the user-related data file M2 from the music server computing unit M, as shown by a path 23, the user-related data files F1 and F2 of office E-Mails received from the office E-Mail server computing unit F, shown by paths 26 and 27. Hence, the data group G2 may include the user-related data files M2, F1 and F2.

Similarly, the data group G3 may include the user-related data file V3 received from the video server computing unit V, as shown by a path 42, the user-related data files M3 and M4 from the music server computing unit M shown by paths 24 and 25. Each of the at least one user-related data file V1 to F2 of the at least one data group G1, G2 and G3 may have a respective predefined data output characteristic and the outputting of the at least one user-related data file of the selected data group G1, G2 and G3 may be based on a respective data output characteristic and on a physical environment of the device 12.

The data group G1 may have the predefined group output characteristic that corresponds to the physical position of the device 12 being in the vehicle 13. This may be realized by a signal which can be received by the device 12 from the embedded sensors in the vehicle 13. In other words, once the user with the device 12 enters the vehicle 13 and/or the vehicle 13 is turned on, then the device 12 can receive a signal from the embedded sensors of the vehicle 13 which can indicate that the device 12 is located inside the vehicle 13. On the basis of this predefined group output characteristic, the data group G1 can be selected.

Furthermore, as shown in the FIGURE, a physical environment condition R1, R2 of the device 12 may be a driving condition of the vehicle 13. As shown in the FIGURE, the physical environment condition R1 may be a driving condition corresponding to a manual driving of the vehicle 13 by the user, as shown by a path 31. The physical environment condition R2 may be a driving condition corresponding to an autonomous driving of the vehicle 13, as shown by a path 32. The predefined data output characteristics can be adapted according to the physical environment condition R1, R2 of the device 12. In the case of the physical environment condition R1, where the user may drive the vehicle 13 manually, the user-related data P1, P2, N1, N2 and M1 may be outputted by the user interface 11 of the device 12 on as per the adopted predefined data output characteristics. However, it is to be noted, that the user-related data V1 which is in the form of a video data file, is not outputted in this case. Since, a video data file can distract the user while driving the vehicle 13, which in return can also lead to an accident. Furthermore, in the case of the physical environment condition R2, wherein the vehicle 13 is driven autonomously. In this case, all the user-related data P1, P2, N1, N2, M1 and V1 may be outputted corresponding to the data group G1 on the user interface 11 of the device 12. The user interface 11 can be in the form of a touchscreen, a display panel including of an audio unit as well as a display unit as well as a haptic unit. Furthermore, a duration of a journey along a driving route that has been planned by a navigation system (not shown in FIGURE) may be estimated and a rate of outputting of the user-related data files P1, P2, N1, N2 and M1 of the data group G1, for the physical environment condition R1, may be adapted accordingly. Similarly, a rate of outputting of the user-related data files P1, P2, N1, N2, M1 and V1 of the data group G1, for the physical environment condition R2, may be adapted accordingly.

In the case, when the user is in the office 14 or in a region 40 with a threshold distance D1 from the predefined geographical location 37 of the office 14, then the data group G2 may be selected. Here, however, one predefined data output characteristic may correspond to a physical environment condition Q1, which may be a solitary environment condition, as shown by a path 33 and another predefined data output characteristic may correspond to a physical environment condition Q2, which may be a physical environment condition with a plurality of persons present, as shown by a path 34. In the case of the physical environment condition Q1, the user may be with the device 12 alone in the office 14. In this case, the user-related data files M2, F1 and F2 may be outputted on the user interface 11 of the device 12. The user-related data files F1 and F2 can be displayed in the form of a text output, whereas the user-related data file M2 may be outputted in the form of an audio signal.

However, in the case of the physical environment condition Q2, where the user may be surrounded by a plurality of persons, then the user-related data files F1 and F2 are displayed on the user interface 11 of the device 12. It is to be noted that the user-related data file M2 is not outputted in this case. Since an audio signal which is needed for the outputting of the user-related data file M2 could cause inconvenience during the presence of the plurality of persons.

Finally, when the user may be in a sports studio 15 or in a region 41 with a threshold distance D2 from the predefined geographical location 38 of the sports studio 15, then the data group G2 may be selected. In this case, the user-related data files M3, M4 and M5 corresponding to the group G3 may be outputted in the form of audio signals at the user interface 11 of the device 12, as shown by a path 35. It is to be noted, that the user-data file V3 of group G3 may be outputted as an audio data file M5 in this case, since the user may prefer to only listen to audio data files while performing sport activities in the sport studio 15.

Furthermore, the managing of the at least one user-related data file V1 to F2 into the at least one data group G1, G2 and G3 may be updated on the basis of the at least one predefined criterion, when the receiving of a new user-related data file (not shown in FIGURE) occurs and/or when the outputting of one of the user-related data file V1 to F2 occurs, wherein an update signal (not shown in FIGURE) may be sent to the at least one of the plurality of server computing units V, P, N, M and F.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for receiving, managing and outputting a plurality of user-related data files of different data types on a user-interface of a device, comprising:
   receiving, by the device, each of the user-related data files from at least one of a plurality of server computers respectively depending on the data types of the user-related data files, the data types including a text format, a video format, and an audio format;

sorting, by the device, the plurality of user-related data files into at least one data group based on a user's predefined preferences and at least one predefined criterion including at least one of the data types, each of the at least one data group having a predefined group output characteristic;

receiving, by the device, at least one sensor signal to indicate a physical position of the device;

automatically selecting, by the device, at least one selected data group from among the at least one data group based on the predefined group output characteristic on one side and at least one of the physical position of the device and a predefined threshold value of a predefined distance of the physical position of the device from a predefined geographic location on the other side based on the at least one sensor signal received by the device;

automatically updating, by the device, the selected data group when a predefined threshold value of a predefined distance of the physical position of the device from another predefined geographic location is met based on the at least one sensor signal received by the device; and outputting, by the device, at least one user-related data file included in the selected data group, based on predefined data output characteristics, respectively associated with the user-related data files, and on a physical environment condition of the device, the outputting including adapting, based on the physical environment condition of the device, a rate of outputting of the at least one selected user-related data file of the selected data group, adapting the predefined data output characteristics, adapting an audio volume of the at least one user-related data file of the selected data group, and converting the audio data files and the video data files to the text format.

2. The method according to claim 1, further comprising:
updating the sorting of the user-related data files into the at least one data group is updated based on the at least one predefined criterion, at least one of when the receiving of a new user-related data file occurs and when the outputting of the at least one user-related data file occurs; and
sending an update signal to the at least one of the plurality of server computers.

3. The method according to claim 2, wherein one of the at least one data group has a first predefined group output characteristic that corresponds to the physical position of the device being in a vehicle.

4. The method according to claim 3, wherein the physical environment condition of the device includes a driving condition of the vehicle.

5. The method according to claim 4, wherein a second predefined data output characteristic corresponds to an autonomous driving condition and a third predefined data output characteristic corresponds to a manual driving condition.

6. The method according to claim 5, further comprising:
estimating a duration of a journey along a driving route that has been planned by a navigation system; and
adapting a rate of the outputting of the at least one user-related data file of the at least one selected data group, such that the at least one user-data related data file of the at least one selected data group is outputted before an end of the journey along the driving route.

7. The method according to claim 3, wherein one of the at least one data group has a second predefined group output characteristic that corresponds to the physical position of the device being in a stationary location.

8. The method according to claim 7, wherein a third predefined data output characteristic corresponds to a solitary environment condition and a fourth predefined data output characteristic corresponds to a group environment condition with a plurality of persons present.

9. The method according to claim 8, wherein the outputting of the at least one user-related data file includes at least one of a visual output signal, an audio output signal and a haptic output signal.

10. The method according to claim 3, wherein a second predefined data output characteristic corresponds to an autonomous driving condition and a third predefined data output characteristic corresponds to a manual driving condition.

11. A non-transitory computer-readable medium embodying a program for receiving, managing and outputting a plurality of user-related data files of different data types on a user-interface of a device that when executed by a computer performs a method comprising:
receiving, by the device, each of the user-related data files from at least one of a plurality of server computers respectively depending on the data types of the user-related data files, the data types including a text format, a video format, and an audio format;

sorting, by the device, the plurality of user-related data files into at least one data group including at least one of the data types based on a user's predefined preferences and at least one predefined criterion, each of the at least one data group having a predefined group output characteristic;

receiving, by the device, at least one sensor signal to indicate a physical position of the device;

automatically selecting, by the device, at least one selected data group from among the at least one data group based on the predefined group output characteristic on one side and at least one of the physical position of the device and a predefined threshold value of a predefined distance of the physical position of the device from a predefined geographic location on the other side based on the at least one sensor signal received by the device;

automatically updating, by the device, the selected data group when a predefined threshold value of a predefined distance of the physical position of the device from another predefined geographic location is met based on the at least one sensor signal received by the device; and outputting, by the device, at least one user-related data file included in the selected data group, based on predefined data output characteristics, respectively associated with the user-related data files, and on a physical environment condition of the device, the outputting including adapting, based on the physical environment condition of the device, a rate of outputting of the at least one selected user-related data file of the selected data group, adapting the predefined data output characteristics, adapting an audio volume of the at least one user-related data file of the selected data group, and converting the audio data files and the video data files to the text format.

12. The computer-readable medium according to claim 11, wherein the method further comprises:

updating the sorting of the user-related data files into the at least one data group is updated based on the at least one predefined criterion, at least one of when the receiving of a new user-related data file occurs and when the outputting of the at least one user-related data file occurs; and sending an update signal to the at least one of the plurality of server computers.

13. The computer-readable medium according to claim 11, wherein a first predefined data output characteristic corresponds to an autonomous driving condition and a second predefined data output characteristic corresponds to a manual driving condition.

14. The computer-readable medium according to claim 11, wherein one of the at least one data group has a predefined group output characteristic that corresponds to the physical position of the device being in a stationary location.

15. The computer-readable medium according to claim 11, wherein a first predefined data output characteristic corresponds to a solitary environment condition and a second predefined data output characteristic corresponds to a group environment condition with a plurality of persons present.

16. A device for receiving, managing and outputting a plurality of user-related data files of different data types obtained from a plurality of server computers, comprising:

a communication interface configured to receive user-related data files from at least one of the plurality of server computers respectively depending on the data types of the user-related data files, the data types including a text format, a video format, and an audio format; and a processor configured to
sort the plurality of user-related data files into at least one data group including at least one of the data types based on a user's predefined preferences and at least one predefined criterion, each of the at least one data group having a predefined group output characteristic, receive, by the device, at least one sensor signal to indicate a physical position of the device, automatically select at least one selected data group from among the at least one data group based on the predefined group output characteristic on one side and at least one of the physical position of the device and a predefined threshold value of a predefined distance of the physical position of the device from a predefined geographic location on the other side based on the at least one sensor signal received by the device, and automatically update the selected data group when a predefined threshold value of a predefined distance of the physical position of the device from another predefined geographic location is met based on the at least one sensor signal received by the device; and at least one of an audio and video output configured to output at least one user-related data file included in the selected data group, based on predefined data output characteristics, respectively associated with the user-related data files, and on a physical environment condition of the device, the output including adapt, based on the physical environment condition of the device, a rate of output of the at least one selected user-related data file of the selected data group, adapt the predefined data output characteristics, adapt an audio volume of the at least one user-related data file of the selected data group, and convert the audio data files and the video data files to the text format.

17. The device according to claim 16,
wherein the processor is further configured to update the sorting of the user-related data files into the at least one data group is updated based on the at least one predefined criterion, at least one of when the receiving of a new user-related data file occurs and when the outputting of the at least one user-related data file occurs, and wherein the communication interface is configured to send an update signal to the at least one of the plurality of server computers.

18. The device according to claim 16, wherein a first predefined data output characteristic corresponds to an autonomous driving condition and a second predefined data output characteristic corresponds to a manual driving condition of a vehicle.

19. The device according to claim 16, wherein one of the at least one data group has a predefined group output characteristic that corresponds to the physical position of the device being in a stationary location.

20. The device according to claim 16, wherein a first predefined data output characteristic corresponds to a solitary environment condition and a second predefined data output characteristic corresponds to a group environment condition with a plurality of persons present.

* * * * *